(12) United States Patent
Kannan et al.

(10) Patent No.: US 11,468,244 B2
(45) Date of Patent: Oct. 11, 2022

(54) LARGE-SCALE MULTILINGUAL SPEECH RECOGNITION WITH A STREAMING END-TO-END MODEL

(71) Applicant: Google LLC, Mountain View, CA (US)

(72) Inventors: Anjuli Patricia Kannan, Berkeley, CA (US); Tara N. Sainath, Jersey City, NJ (US); Yonghui Wu, Fremont, CA (US); Ankur Bapna, Sunnyvale, CA (US); Arindrima Datta, New York, NY (US)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 16/834,342

(22) Filed: Mar. 30, 2020

(65) Prior Publication Data

US 2020/0380215 A1    Dec. 3, 2020

Related U.S. Application Data

(60) Provisional application No. 62/853,365, filed on May 28, 2019.

(51) Int. Cl.
    *G10L 15/00*    (2013.01)
    *G06F 40/40*    (2020.01)

(52) U.S. Cl.
    CPC ............ *G06F 40/40* (2020.01); *G10L 15/005* (2013.01)

(58) Field of Classification Search
    CPC ....... G06F 40/40; G10L 15/005; G10L 15/16; G10L 15/32; G10L 15/26; G06N 3/0454; G06N 3/08; G06N 3/0445
    See application file for complete search history.

(56) References Cited

U.S. PATENT DOCUMENTS

| | | | |
|---|---|---|---|
| 10,032,463 B1* | 7/2018 | Rastrow | G10L 15/183 |
| 10,580,400 B2* | 3/2020 | Jeong | G10L 15/005 |
| 2017/0011738 A1* | 1/2017 | Senior | G10L 15/063 |
| 2017/0140753 A1* | 5/2017 | Jaitly | G06F 40/55 |
| 2018/0240456 A1* | 8/2018 | Jeong | G10L 15/005 |

(Continued)

OTHER PUBLICATIONS

Bo (Multi-Dialect Speech Recognition With a Single Sequence-To-Sequence Model, 2018 IEEE International Conference on Acoustics, Speech and Signal Processing (ICASSP), Apr. 2018) (Year: 2018).*

(Continued)

*Primary Examiner* — Abdelali Serrou
(74) *Attorney, Agent, or Firm* — Honigman LLP; Brett A. Krueger; Grant Griffith

(57) ABSTRACT

A method of transcribing speech using a multilingual end-to-end (E2E) speech recognition model includes receiving audio data for an utterance spoken in a particular native language, obtaining a language vector identifying the particular language, and processing, using the multilingual E2E speech recognition model, the language vector and acoustic features derived from the audio data to generate a transcription for the utterance. The multilingual E2E speech recognition model includes a plurality of language-specific adaptor modules that include one or more adaptor modules specific to the particular native language and one or more other adaptor modules specific to at least one other native language different than the particular native language. The method also includes providing the transcription for output.

22 Claims, 6 Drawing Sheets

(56) References Cited

U.S. PATENT DOCUMENTS

2019/0005947 A1\* 1/2019 Kim .................... G10L 15/22
2019/0189111 A1\* 6/2019 Watanabe ............ G06N 3/0445
2021/0233517 A1\* 7/2021 Gong .................... G10L 15/005

OTHER PUBLICATIONS

A Kannan, A Datta, TN Sainath, E Weinstein, "Large-scale multilingual speech recognition with a streaming end-to-end model", arXiv preprint arXiv . . . , 2019—arxiv.org. (Year: 2019).\*

\* cited by examiner

LARGE-SCALE MULTILINGUAL SPEECH RECOGNITION WITH A STREAMING END-TO-END MODEL

CROSS REFERENCE TO RELATED APPLICATIONS

This U.S. patent application claims priority under 35 U.S.C. § 119(e) to U.S. Provisional Application 62/843,365, filed on May 28, 2019. The disclosure of this prior application is considered part of the disclosure of this application and is hereby incorporated by reference in its entirety.

TECHNICAL FIELD

This disclosure relates to large-scale multilingual speech recognition with a streaming end-to-end model.

BACKGROUND

Automated Speech Recognition (ASR) systems that can transcribe speech in multiple languages, which are referred to as multilingual ASR systems, have gained popularity as an effective way to expand ASR coverage of the world's languages. Through shared learning of model elements across different languages, conventional multilingual ASR systems have been shown to outperform monolingual ASR systems, particularly for those languages where less training data is available.

Conventional multilingual ASR systems can be implemented using a significantly simplified infrastructure, owing to the fact that multiple natural languages can be supported with just a single speech model rather than with multiple individual models. In most state-of-the-art multilingual ASR systems, however, only the acoustic model (AM) is actually multilingual, and separate, language-specific language models (LMs) and their associated lexicons are still required.

Recently, end-to-end (E2E) models have shown great promise for ASR, exhibiting improved word error rates (WERs) and latency metrics as compared to conventional on-device ASR systems. These E2E models, which fold the AM, pronunciation model (PM), and LMs into a single network to directly learn speech-to-text mapping, have shown competitive results compared to conventional ASR systems which have a separate AM, PM, and LMs. Representative E2E models include word-based connectionist temporal classification (CTC) models, recurrent neural network transducer (RNN-T) models, and attention-based models such as Listen, Attend, and Spell (LAS).

SUMMARY

Implementations herein are directed toward an enhanced, multilingual end-to-end (E2E) model which is equipped to operate in low-latency interactive applications, and which is able to address a key challenge of real world training data, namely the imbalance in the amount of available training data across the many different languages spoken across the world. By conditioning the multilingual E2E model on a language vector and training language-specific adapter layers, the enhanced multilingual E2E model may be trained on a wide variety of training data for different languages and achieve a lower word error rate (WER) than comparable monolingual E2E models and conventional ASR systems, while satisfying the latency constraints of modern, interactive applications. Furthermore, this model can effectively address the challenges inherent in large-scale, real-world data, and is competitive with state-of-the-art conventional models while still operating within the same training and serving constraints.

One aspect of the disclosure provides a method of transcribing speech using a multilingual end-to-end (E2E) speech recognition model. The method includes receiving, at data processing hardware, audio data for an utterance spoken in a particular native language; obtaining, by the data processing hardware, a language vector identifying the particular language; and processing, by the data processing hardware, using the multilingual E2E speech recognition model, the language vector and acoustic features derived from the audio data to generate a transcription for the utterance. The multilingual E2E speech recognition model includes a plurality of language-specific adaptor modules that include one or more adaptor modules specific to the particular native language and one or more other adaptor modules specific to at least one other native language different than the particular native language. The method also includes providing, by the data processing hardware, the transcription for output.

Implementations of the disclosure may include one or more of the following optional features. In some implementations, the method also includes, prior to processing the language vector and the acoustic features, generating, by the data processing hardware, using the audio data, a vector representation of the utterance. The vector representation of the utterance includes the acoustic features derived from the audio data. In these implementations, the method may further include concatenating, by the data processing hardware, the language vector and the vector representation of the utterance to generate an input vector. Here, processing the language vector and the acoustic features includes processing, using the multilingual E2E speech recognition model, the input vector to generate the transcription for the utterance.

The language vector may include a one-hot vector. In some examples, obtaining the language vector includes identifying the particular native language for the utterance based on a language preference for a user that spoke the utterance and generating the language vector based on the identified particular native language. In other examples, obtaining the language vector includes executing a language identification system configured to identify the particular native language by processing the audio data and generating the language vector based on the identified particular native language.

In some implementations, the multilingual E2E speech recognition model uses a recurrent neural network-transducer (RNN-T) architecture that includes an encoder network, a prediction network, and a joint network. The encoder network is configured to generate, at each of a plurality of time steps, a higher-order feature representation from an input vector that includes a concatenation of the language vector and the acoustic features derived from the audio data. The prediction network is configured to process a sequence of previously output non-blank symbols into a dense representation. The joint network configured to predict, at each of the plurality of time steps, a probability distribution over possible output labels based on the higher-order feature representation output by the encoder network and the dense representation output by the prediction network. In these implementations, the encoder network may include a plurality of stacked Long Short-Term Memory (LSTM) layers and after each LSTM layer, a respective layer that includes a respective subset of the plurality of language-specific adaptor modules. Here, each language-specific adaptor module in the respective layer is specific to a different respective native language, wherein one of the language-specific adaptor modules in the respective layer is specific to the particular native language. The generated transcription for the utterance may be in a respective native script representing the particular native language.

In some configurations, the multilingual E2E speech recognition model is trained by a training process. In some examples, the training process occurs on a remote computing device, and once the model is trained, the remote computing device pushes the model to a user device for executing the model on the data processing hardware of the user device. Notably, the data processing hardware may alternatively reside on a remote computing device in communication with a user device that captured the utterance via one or more microphones of the user device. The training process may include steps of obtaining a plurality of training data sets each associated with a respective native language that is different than the respective native language of the other training data sets, training the multilingual E2E speech recognition model on a union of all the training data sets using a stochastic optimization algorithm, and during a second stage of the training process after the first stage is complete, modifying the multilingual E2E speech recognition model to include the plurality of language-specific adaptor modules. Each training data set of the plurality of training data sets includes a plurality of respective training data samples. Each training data sample includes audio data for an utterance spoken in the respective native language, a language identifier identifying the respective native language, and a corresponding transcription of the utterance in a respective native script representing the respective native language. Moreover, during the second stage of the training process, the training process further includes, for each of the one or more adaptor modules that are specific to the particular native language, learning values for a respective set of weights by training the multilingual E2E speech recognition model only on the training data set that is associated with the respective particular native language.

Another aspect of the disclosure provides a system for transcribing speech using a multilingual end-to-end (E2E) speech recognition model. The system includes data processing hardware and memory hardware in communication with the data processing hardware, the memory hardware storing instructions that when executed on the data processing hardware cause the data processing hardware to perform operations including receiving audio data for an utterance spoken in a particular native language; obtaining a language vector identifying the particular language; and processing, using the multilingual E2E speech recognition model, the language vector and acoustic features derived from the audio data to generate a transcription for the utterance. The multilingual E2E speech recognition model includes a plurality of language-specific adaptor modules that include one or more adaptor modules specific to the particular native language and one or more other adaptor modules specific to at least one other native language different than the particular native language. The operations also includes providing, by the data processing hardware, the transcription for output This aspect may include one or more of the following optional features. In some implementations, the operations also include, prior to processing the language vector and the acoustic features, generating, using the audio data, a vector representation of the utterance. The vector representation of the utterance includes the acoustic features derived from the audio data. In these implementations, the operations may further include concatenating the language vector and the vector representation of the utterance to generate an input vector. Here, processing the language vector and the acoustic features includes processing, using the multilingual E2E speech recognition model, the input vector to generate the transcription for the utterance.

The language vector may include a one-hot vector. In some examples, obtaining the language vector includes identifying the particular native language for the utterance based on a language preference for a user that spoke the utterance and generating the language vector based on the identified particular native language. In other examples, obtaining the language vector includes executing a language identification system configured to identify the particular native language by processing the audio data and generating the language vector based on the identified particular native language.

In some implementations, the multilingual E2E speech recognition model uses a recurrent neural network-transducer (RNN-T) architecture that includes an encoder network, a prediction network, and a joint network. The encoder network is configured to generate, at each of a plurality of time steps, a higher-order feature representation from an input vector that includes a concatenation of the language vector and the acoustic features derived from the audio data. The prediction network is configured to process a sequence of previously output non-blank symbols into a dense representation. The joint network configured to predict, at each of the plurality of time steps, a probability distribution over possible output labels based on the higher-order feature representation output by the encoder network and the dense representation output by the prediction network. In these implementations, the encoder network may include a plurality of stacked Long Short-Term Memory (LSTM) layers and after each LSTM layer, a respective layer that includes a respective subset of the plurality of language-specific adaptor modules. Here, each language-specific adaptor module in the respective layer is specific to a different respective native language, wherein one of the language-specific adaptor modules in the respective layer is specific to the particular native language. The generated transcription for the utterance may be in a respective native script representing the particular native language.

In some configurations, the multilingual E2E speech recognition model is trained by a training process. In some examples, the training process occurs on a remote computing device, and once the model is trained, the remote computing device pushes the model to a user device for executing the model on the data processing hardware of the user device. Notably, the data processing hardware may alternatively reside on a remote computing device in communication with a user device that captured the utterance via one or more microphones of the user device. The training process may include steps of obtaining a plurality of training data sets each associated with a respective native language that is different than the respective native language of the other training data sets, training the multilingual E2E speech recognition model on a union of all the training data sets using a stochastic optimization algorithm, and during a second stage of the training process after the first stage is complete, modifying the multilingual E2E speech recognition model to include the plurality of language-specific adaptor modules. Each training data set of the plurality of training data sets includes a plurality of respective training data samples. Each training data sample includes audio data for an utterance spoken in the respective native language, a language identifier identifying the respective native language, and a corresponding transcription of the utterance in a respective native script representing the respective native language. Moreover, during the second stage of the training process, the training process further includes, for each of the one or more adaptor modules that are specific to the particular native language, learning values for a respective set of weights by training the multilingual E2E speech recognition model only on the training data set that is associated with the respective particular native language.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
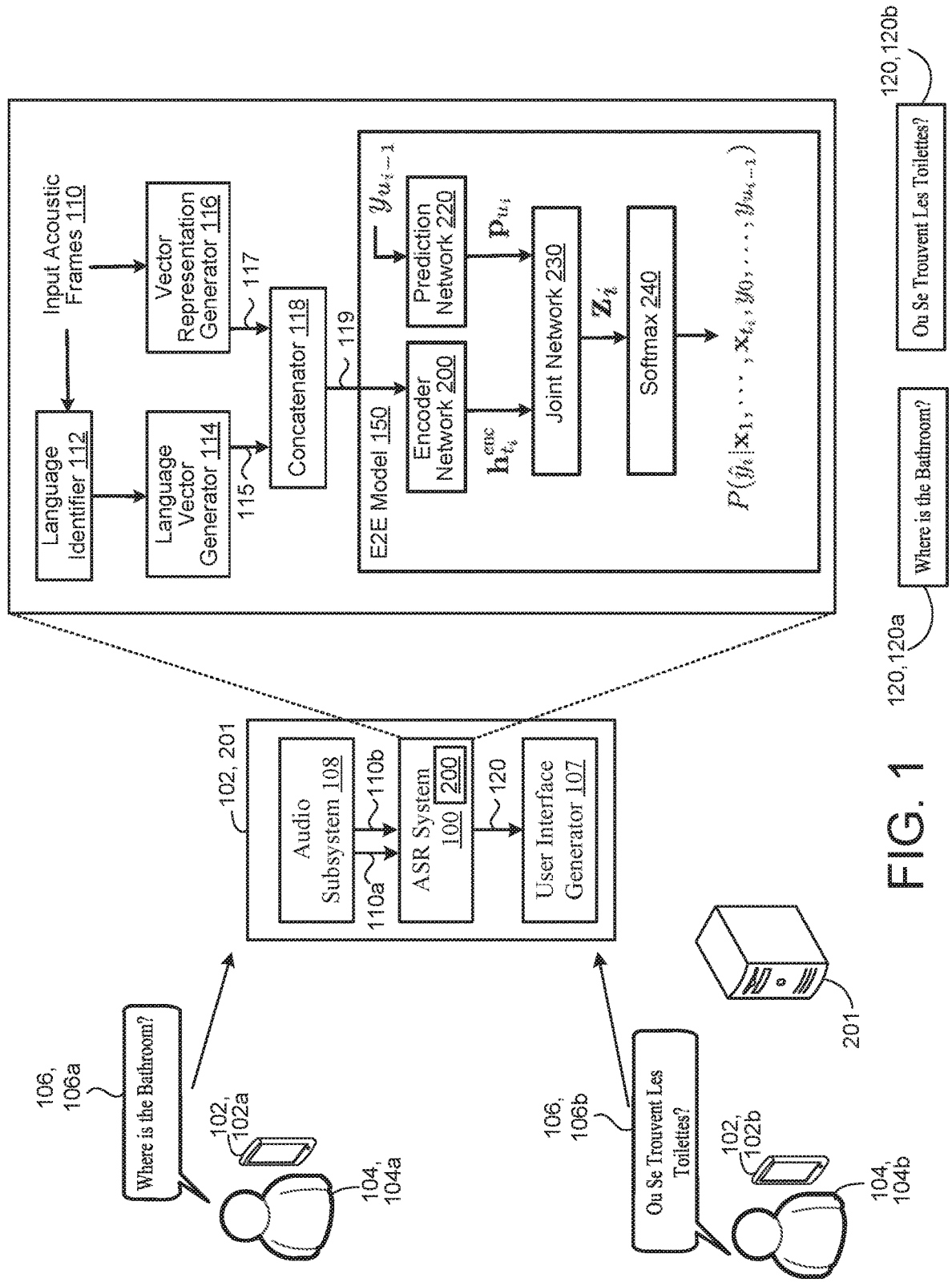
FIG. 1 is a schematic view of an automatic speech recognition (ASR) system that includes a streaming, end-to-end (E2E) speech recognition model for multilingual speech recognition.

FIG. 1 shows an example, enhanced automated speech recognition (ASR) system 100 that implements a streaming, end-to-end (E2E) speech recognition model 150 (interchangeably referred to as 'model 150') for multilingual speech recognition. In the example shown, the ASR system 100 resides on user devices 102, 102a-b of respective users 104, 104a-b that speak different native languages. Specifically, the user 104a of the user device 102a speaks English as his/her respective native language and the user 104b of the user device 102b speaks French as his/her respective native language. While the example shown depicts the ASR system 100 residing on a user device 102, some or all components of the ASR system 100 may reside on a remote computing device 201 (e.g., one or more servers of a distributed system executing in a cloud-computing environment) in communication with the user device 102. Moreover, other users 104 may speak other languages or languages of other dialects such as, without limitation, English, French, Spanish, Chinese, German, Japanese, Bangali, Hindi, Kannada, and/or Tamil. Although the user devices 102 are depicted as mobile phones, the user devices 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

Each of the user devices 102 include an audio subsystem 108 configured to receive utterances 106 spoken by the users 104 (e.g., the user devices 102 may include one or more microphones for recording the spoken utterances 106) in their respective native languages and convert the utterances 106 into a corresponding digital format associated with input acoustic frames 110 capable of being processed by the ASR system 100. In the example shown, each user 104 speaks a respective utterance 106, 106a-b in the respective native language of the English phrase "Where is the bathroom?" and the audio subsystem 108 converts each utterance 106, 106a-b into corresponding acoustic frames 110, 110a-b for input to the ASR system 100. Here, the acoustic frames 110a are associated with audio spoken in the respective native language of English and the acoustic frames 110b are associated with audio spoken in the respective native language of French. The acoustic frames 110 may be a series of parameterized input acoustic frames that each include 80-dimensional log-Mel features, computed with a short, e.g., 25 ms, window and shifted every few, e.g., 10, milliseconds.

The ASR system 100 is configured to process the parameterized input acoustic frames 110 associated with each utterance 106, and output a respective transcription 120, i.e., a first transcription 120a in English script "Where is the bathroom?" and a second transcription 120b in French script "Où se trouvent les toilettes?". As used herein, the term "script" generally refers to a writing system that includes a system of symbols that are used to represent a natural language. In the example shown, the user device 102 and/or the remote computing device 201 also executes a user interface generator 107 configured to present a representation of the respective transcription 120 for each utterance 106 to the respective user 104 of the user device 102. For instance, the user interface generator 107 may generate computer code representing the respective transcription 120 such that a user interface of the user device 102 may display the transcription 120 on a screen of the user device 102.

In some configurations, the transcription 120 output from the ASR system 100 is processed, e.g., by a natural language understanding (NLU) module executing on the user device 102 or the remote computing device 201, to execute a user command. For instance, in the example shown, the transcription 120 for each respective utterance 106 includes a query that may be provided to a search engine for retrieving an answer. For instance, the search engine may provide an answer with instructions/directions to the bathroom. In this example, the user interface generator 107 may cause the graphical user interface of each user device 102 to display a textual representation of the instructions/directions to the bathroom in the respective native language of the corresponding user 104. Additionally or alternatively, a text-to-speech system (e.g., executing on any combination of the user device 102 or the remote computing device 201) may convert the textual representation of the instructions/directions into synthesized speech for audible output by the user device 102.

With continued reference to FIG. 1, the ASR system 100 includes a language identifier 112, a language vector generator 114, a vector representation generator 116, a concatenator 118, and the streaming, E2E speech recognition model 150. The language identifier 112 is configured to receive the input acoustic frames 110 of each respective utterance 106 and identify the respective native language. There are a multitude ways to determine the language associated with each utterance. For instance, a language preference for a user 104 may be set explicitly by the user 104 when opening up a program on their device 102 for the first time or by the user 104 explicitly setting the language preference in a profile for the user 104. Alternatively, the language preference for the user 104 may be a default setting that includes the prominent native language spoken in the geographical region of the user 104. In another example, the language identifier 112 may execute a language identification system capable of determining the language on a per-utterance basis.

Using the native language identified by the language identifier 112, the language vector generator 114 is configured to generate a respective language vector 115 associated with the identified language for the respective utterance 106. As discussed in greater detail below, the use of the language vector 115 serves as an extension to the multilingual E2E model 150 by permitting the model 150 to be fed the identified language for activating appropriate language-specific adaptor modules 300 (FIGS. 2A, 2B, and 3) of an encoder network 210. In doing so, the language-specific adaptor models 218 may capture quality benefits of fine-tuning the model 150 on each individual language, while maintaining the parameter efficiency of having a single global, multilingual E2E model 150.

In some examples, the language vector 115 is a fixed-length vector that represents the respective language as a "one-hot" vector. Here, each of k languages used to train the multilingual E2E model 150 will be represented by a corresponding k-dimensional vector, whereby for a given language i, all bits are set to 0 except the ith which is set to one (1). In additional examples, the language vector 115 represents the language as an embedding vector where a dimensionality d is chosen, and each language is represented by d floating point weights. These weights may be learned during training. Finally, a language may be represented as a combination of clusters learned through cluster adaptive training (CAT). In this variation, clusters are learned from the data. Each cluster is represented as a k-dimensional one-hot vector, as described above. Particular examples can then be expressed as weighted combinations of clusters, and the weights assigned to each cluster then compose a k-dimensional language vector.

The vector representation generator 116 also receives the input acoustic frames 110 of each respective utterance 106 and generates a respective vector representation 117 for each utterance 106. The vector representation 117 may include acoustic features derived from the audio data (e.g., input acoustic frames 110). In some examples, the vector representation 117 includes a d-dimensional feature vector (x) output by the vector representation generator 116 at each timestep, such that the vector representation generator 116 generates a sequence of d-dimensional feature vectors $x=(x_1, x_2, \ldots, x_T)$, where $x_t \in \mathbb{R}^d$. In some examples, the concatenator 118 concatenates the respective language vector 115 (e.g., one-hot vector) and the respective vector representation 117 (d-dimensional feature vector) of each utterance 106 for input, as an input vector 119, to the multilingual E2E speech recognition model 150.

Figure 2A:
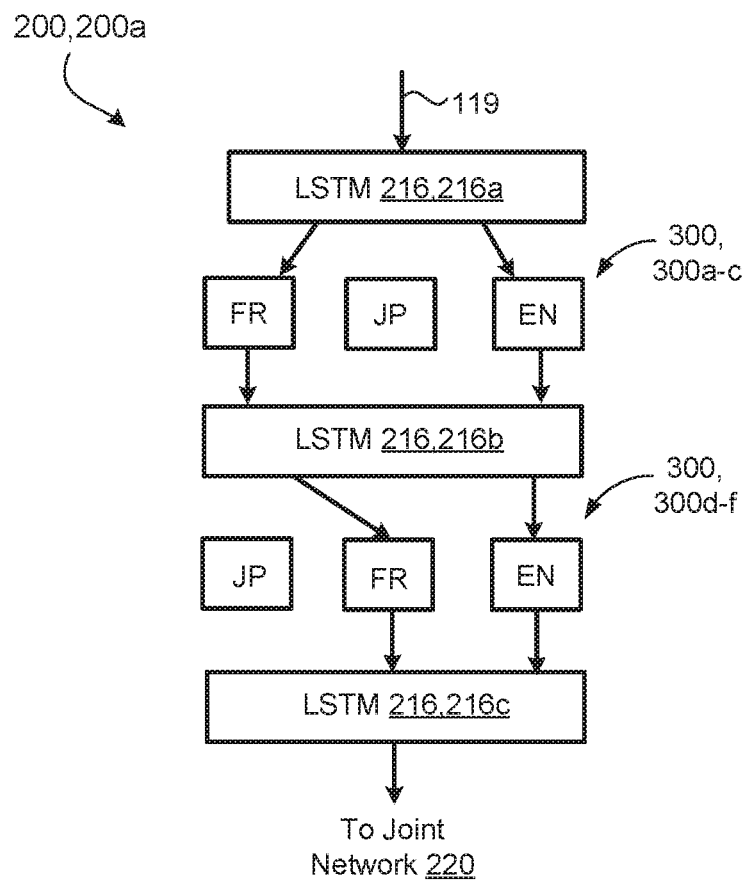
FIGS. 2A and 2B are schematic views of the streaming E2E speech recognition model of the ASR system of FIG. 1 including a plurality of language adaptors associated with different respective languages.
Figure 2B:
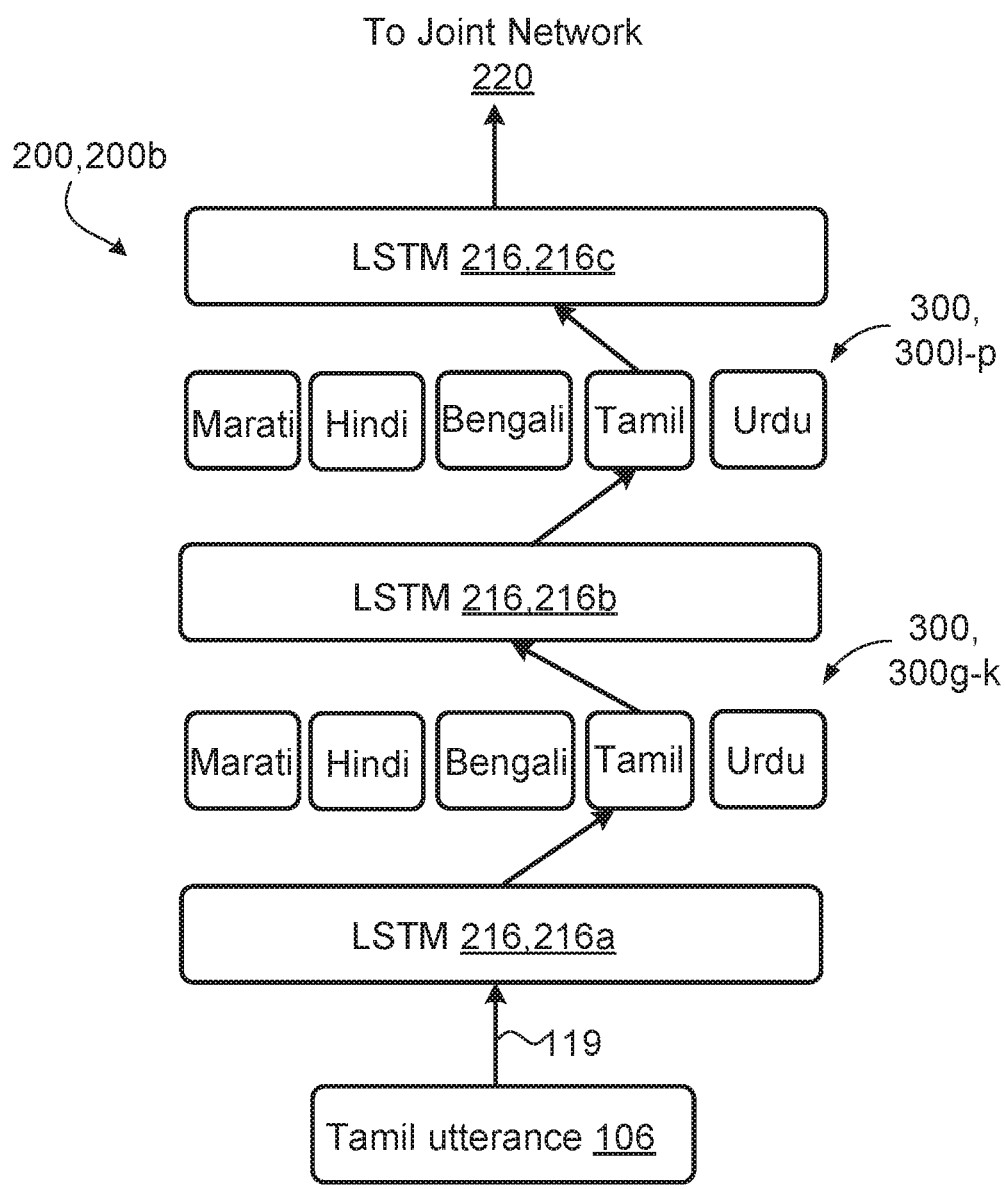

In some implementations, the multilingual E2E speech recognition model 150 uses a recurrent neural network-transducer (RNN-T) architecture which adheres to latency constraints associated with interactive applications and includes an encoder network 200, a prediction network 220, and a joint network 230. The encoder network 200 is roughly analogous to an acoustic model (AM) in a conventional ASR system and includes a recurrent network of stacked Long Short-Term Memory (LSTM) layers 216 (FIGS. 2A and 2B). In the example shown, the encoder network 200 receives the input vector 119 corresponding to the concatenation of the language vector 115 and the vector representation 117 (e.g., sequence of d-dimensional feature vectors $x=(x_1, x_2, \ldots, x_T)$), and generates, at each time step, a higher-order feature representation. This higher-order feature representation may be denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $h_{a_i}^{dec}$. Finally, with the RNN-T model architecture, the representations produced by the encoder and prediction networks 200, 220 are combined by the joint network 230. The joint network 230 then predicts $P(y_i|x_1, \ldots, x_{t_i}, y_0, \ldots y_{u_{i-1}})$, which is a distribution over the next output symbol. The Softmax layer 240 may employ any technique to select the output symbol with the highest probability in the distribution as the next output symbol predicted by the model 150. In this manner, the multilingual RNN-T model 150 does not make a conditional independence assumption, rather the prediction of each symbol is conditioned not only on the acoustics but also on the sequence of labels output so far. The multilingual RNN-T model 150 does assume an output symbol is independent of future acoustic frames 110, which allows a multilingual RNN-T model to be employed in a streaming fashion.

In some examples, the encoder network 200 is made up of eight 2,048-dimensional LSTM layers, each followed by a 640-dimensional projection layer. The prediction network 220 may have two 2,048-dimensional LSTM layers, each of which is also followed by 640-dimensional projection layer. Finally, the joint network 230 may also have 640 hidden units. The softmax layer 240 may be composed of a unified grapheme set from all languages, i.e., 988 graphemes in total, that is generated using all unique graphemes in training data. The model 150 may be trained in in Lingvo on 8×8 Tensor Processing Units slices with a batch size of 4,096. As described in more detail below with reference to FIG. 3, the adapter modules 300 each use a 256-dimensional bottleneck after each of the eight encoder layers 216.

Implementations herein are directed toward equipping the multilingual E2E speech recognition model 150 to operate in low-latency interactive applications, while addressing a key challenge of real world training data, namely an imbalance in the amount of available training data across languages. Specifically, the language vector 115 offers a first extension to the architecture of the multilingual E2E speech recognition model 150 to address training data imbalances by conditioning the model 150 on specific language information so that the multilingual model 150 can become an "expert" on each individual language instead of learning a representation tailored to languages with more data. Moreover, applying the language-specific adaptor modules 300 to the encoder network 200, which include domain-specific adjustments to the activations output from each LSTM layer 216, offer a second extension to the architecture of the multilingual E2E speech recognition model 150 by fine-tuning the model 150 on each individual language during training, yet still maintaining the parameter efficiency of having a single global, multilingual E2E model 150.

Referring to FIGS. 2A and 2B, the encoder network 200, 200a-b of the multilingual E2E speech recognition model 150 using the RNN-T architecture includes multiple, LSTM layers 216, 216a-c, with multiple, language-specific adaptor modules 300 disposed between adjacent LSTM layers 216. While each of the example encoder networks 200a, 200b include three LSTM layers 216 in the example shown, the encoder networks 200 may include any number of LSTM layers 216. In one example, the encoder networks 200a, 200b include eight LSTM layers 216.

The encoder network 200a of FIG. 2A belongs to a multilingual E2E speech recognition model 150 trained to perform speech recognition on utterances spoken in any one of French, Japanese, or English. Accordingly, after the first LSTM layer 116a, the encoder network 200a includes a layer of language-specific adaptor modules 300a-c each corresponding to a respective one of the French (FR), Japanese (JP), and English (EN) languages. Similarly, after the second LSTM layer 216b, the encoder network includes another layer of language-specific adaptor modules 300d-f each corresponding to a respective one of the French (FR), Japanese (JP), and English (EN) languages.

Continuing with the example of FIG. 1, the encoder network 200a processes the input vector 119 associated with the utterance 106a spoken in English by passing the input vector 119 through the first LSTM layer 216a, passing an output from the first LSTM layer 216a through the appropriate adaptor module 300c for English utterance 106a, processing the output of the adaptor module 300a by the second LSTM layer 216b, passing the output from the second LSTM layer 216b through the appropriate adaptor module 300f for the English utterance 106a, and processing the output from the adaptor module 300f to generate the higher-order feature representation provided to the joint network 230. The encoder network 200b similarly processes the respective input vector 119 associated with the French utterance 106b, but the outputs from the first and second LSTM layers 216a, 216b instead pass through the adaptor modules 300a, 300e for the French utterance 106b.

Referring to FIG. 2B, the encoder network 200b belongs to a multilingual E2E speech recognition model 150 trained to perform speech recognition on utterances spoken in Indic languages that include Marati, Hindi, Bengali, Tamil, and Urdu. Here, a layer of language-specific adaptor modules 300g-k is disposed between the first and second LSTM layers 216a, 216b each corresponding to a respective one of the Marati, Hindi, Bengali, Tamil, and Urdu languages, while another layer of language-specific adaptor modules 300l-p is disposed between the second and third LSTM layers 216b, 216f. In the example shown, a respective input vector 119 for an utterance spoken in Tamil. Thus, since the input vector 119 provides the language vector 115 indicating that the utterance 106 is spoken in Tamil, the encoder 200b only applies the Tamil adaptors 300j, 300o to each activation.

Figure 3:
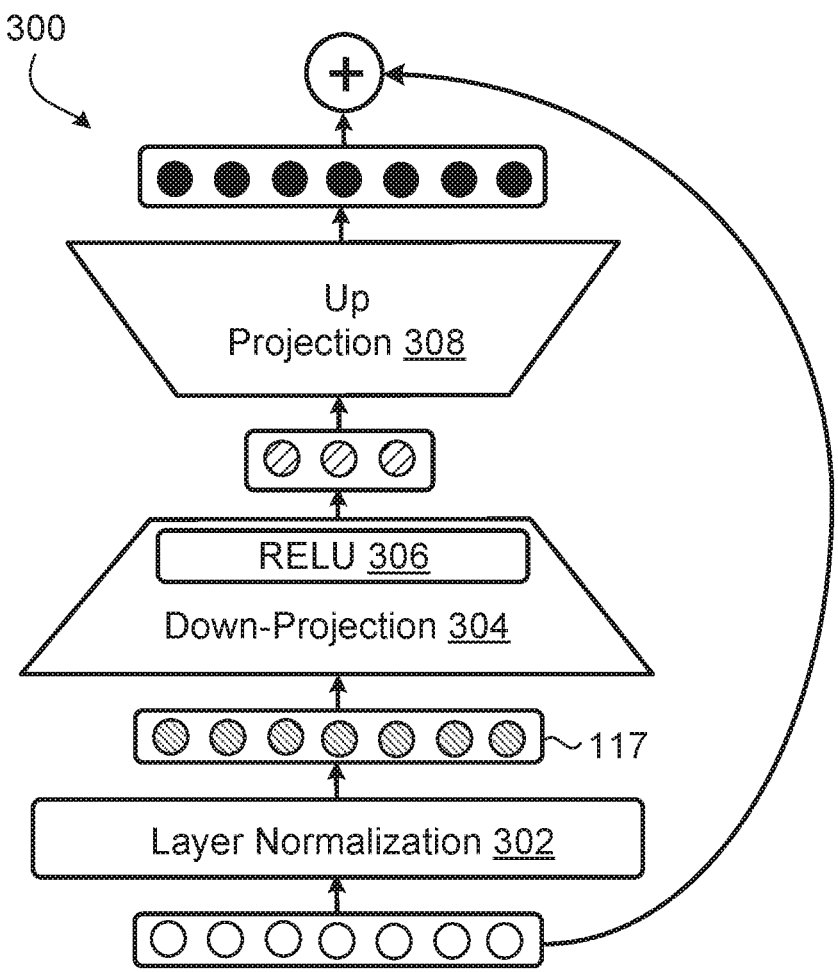
FIG. 3 is a schematic view of an example architecture of a language adaptor in the streaming E2E speech recognition model of FIGS. 1 and 2.

FIG. 3 shows a schematic view of an example architecture for a language-specific adaptor module 300. The adaptor module 300 includes a normalization layer 302, a down-projection 304, a non-linearity 306, and an up-projection 308. Specifically, each activation from a LSTM layer 216 projects down to a smaller dimensionality, passes through the non-linearity, and then projects back up to the original size. The result can be added to the original activation before passing to the next LST layer 216.

The language-specific adapter modules 300 can effectively be implemented into the multilingual E2E model 150 using a two-stage training process. The training process may execute on the remote computing device 201 (FIG. 1) and the remote computing device 201 may push the trained model 150 to the user device(s) 102 for execution thereon. The training process may include obtaining a plurality of training data sets each associated with a respective native language that is different than the respective native language of the other training data sets. Here, each training data set includes a plurality of respective training data samples that each include audio data (e.g., acoustic features) 110 of an utterance 106 spoken in the respective native language, a language vector 115 identifying the respective native language, and a corresponding transcription 120 of the utterance 106 in a respective native script representing the respective native language.

In the first stage, the model 150 globally trains on a union of all languages and may use a stochastic optimization algorithm, such as stochastic gradient descent. A loss function is computed for a batch of examples, and then differentiated with respect to each weight in the model. The resulting gradients are used to update model weights. This repeats until the weights converge.

The second stage of training modifies the globally-trained model 150 to include an adapter layer after every LSTM layer 216 of the encoder network 200. Each adapter layer has a separate set of weights for each language. The training process resumes with data from a single language, such as French. Now, after each batch of examples, gradients are computed only for the adapter weights for French, and not for any other parameters in the model. Thus, the adapter weights for French only update for a series of steps. Then, the training process continues with data from another language, such as English. Again, after each batch of examples, gradients are computed only for the adapter weights for English, and not for any other parameters in the model. Thus, the adapter weights for English only update for a series of steps. This process repeats until the adapter weights for each language are learned.

This multi-stage training results in a single model having a small number of parameters that are specific to each language, which are typically less than 10% of the original model size. Such enhancement allows for efficient parameter sharing across languages, as well as per-language specialization. For instance, the encoder network 200 is mostly shaped by dominant languages, whereas less dominant languages may have distinct acoustic features that can benefit from small per-layer adjustments. Adding the language-specific adapter modules 300 allows the model to specialize in each language in the same way that fine-tuning the whole model would, but in a much more parameter-efficient way. Specifically, in one tested implementation, the capacity added for each language is only about two percent of the original model size.

Furthermore, adapter modules 300 do not need to be employed when they are not helpful. For example, in practice, adapter modules may only be selected or used when they are most effective, while setting all other adapters to identity operations, i.e., setting the weights to zeroes. Such a model would only be slightly larger than the original model, while showing significant gains on those certain.

The effectiveness of adapters on each language is determined by measuring the word error rate (WER) of both the model augmented with language-specific adapters and the model without adapters on a test set in that language. If the language-specific adapter layers do not help, then they do not need to be used. A single model can be composed that contains language-specific adapter layers only for the languages where they help, while for other languages those layers are set to identity operations (i.e. all weights are zero).

Given the wide skew in the distribution of speakers across the world's languages, varying amounts of transcribed data are available as training data for different languages. As a result, considerations are made when training the multilingual E2E model 150 that include avoiding overly influencing the model 150 by languages which are over-represented in the training data. Working with a corpus of a number of different languages including tens of thousands of hours of training data, several enhancements were compared, namely: conditioning on a language vector 115, adjusting language sampling ratios, and using language-specific adapter modules 300. These enhancements can be used alone or in combination. When the above-noted enhancements are combined, the resulting multilingual E2E model 150 surpasses not only monolingual E2E models, but also monolingual conventional systems built with state-of-the-art AMs, lexica, and LMs, and consistently achieves at significant relative reduction in WER on each of the tested languages, i.e., when compared with the monolingual conventional systems.

Data imbalance is a natural consequence of the varied distribution of speakers across the world's languages. Languages with more speakers tend to produce transcribed data more easily. While some ASR systems may only train the AM on transcribed speech data, all components in a multilingual E2E model are trained on transcribed speech data. As a result, multilingual E2E models may be more sensitive to data imbalance.

Regarding data sampling, imbalanced data typically leads to having a model perform better on languages with more training data. For instance, suppose a multilingual model is trained on k languages $L_0, \ldots, L_k$, where $L_i$ has $n_i$ training examples, and $N=\Sigma_{i=0}^{k} n_i$. At each step of training, a batch of examples is assembled by sampling from the N total examples. Assuming that the training examples have been pooled across languages and shuffled, the sampling ratio of language $L_i$ within the batch would be expected to be $$s(i) = \frac{n_i}{N},$$

meaning that the model would be updated with $$\frac{n_i}{n_j}$$

times more gradients generated by language $L_i$ than by language $L_j$ for any i, j where $n_i > n_j$.

Data sampling may address such a data imbalance by up-sampling data from under-represented languages so that the distribution across different languages is more even. In an extreme case, each language uniformly can be sampled to be uniform, such that $$s(i) = \frac{1}{k}$$

for all i. More generally, s(i) can satisfy Equation (1), below:

$$s(i) = \frac{n_i + \alpha * (n^* - n_i)}{\sum_i [n_i + \alpha * (n^* - n_i)]} \quad (1)$$

In Equation (1), n* is the maximum number of examples for any language, and α is a tunable parameter. If α=0, training data for languages are sampled at their natural frequencies, while if α=1, training data for languages are sampled to be uniform. In testing, increasing α from 0 to 0.25 means training data for smaller languages are being up-sampled. As one might expect, WER on all but some of the largest languages in the training data decreases. In doing so, the model's prior on what language to output is being changed, so that when an ambiguous utterance is encountered, the model may be less likely to default to the dominant language.

As set forth in the remarks above, these issues with data imbalance may be addressed through the aforementioned extensions to the architecture of the multilingual E2E model. For instance, the first extension that conditions the model 150 on the language vector 115 to represent the language of each utterance fed to the model 150 can allow the model 150 to become an "expert" on each individual language instead of learning a representation tailored to languages with more data. Additionally, the second extension that modifies the model 150 to include an adaptor layer of language-specific adapter modules after every LSTM layer 216 in the encoder network 200 enables the model 150 to include a small number of parameters that are specific to each language. Conditioning the model 150 on the language vector 115 can be used alone or in combination with the use of the language-specific adaptor modules 300. Similarly, the language-specific adaptor modules 300 can be used alone or in combination with the language vector 115.

Figure 4:
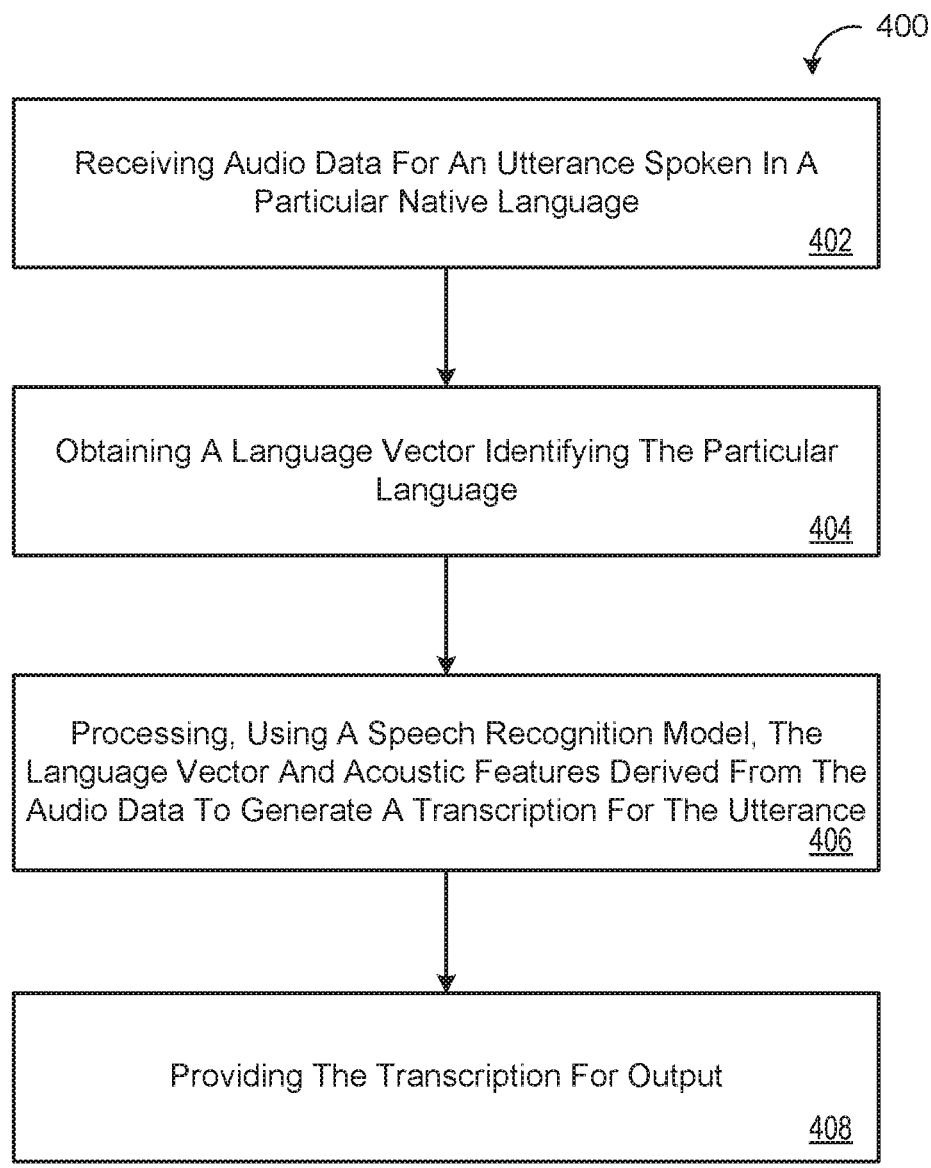
FIG. 4 is a flowchart of an example arrangement of operations of a method of transcribing speech using a multilingual E2E speech recognition model.

FIG. 4 provides a flowchart of an example arrangement of operations for a method 400 of transcribing speech using a multilingual end-to-end (E2E) speech recognition model 150. Data processing hardware 510 (FIG. 5) residing on the user device 102 or the remote computing device 201 may execute the operations for the method 400. At operation 402, the method 400 includes receiving, at data processing hardware 510, audio data 110 for an utterance 106 spoken in a particular native language. At operation 404, the method 400 includes obtaining, by the data processing hardware 510, a language vector 115 identifying the particular language. The language vector 115 may include a one-hot vector.

At operation 406, the method 400 includes processing, by the data processing hardware 510, using the multilingual E2E speech recognition model 150, the language vector 115 and acoustic features 117 derived from the audio data 110 to generate a transcription 120 for the utterance 106. The multilingual E2E speech recognition model 150 includes a plurality of language-specific adaptor modules 300 that include one or more adaptor modules 300 specific to the particular native language and one or more other adaptor modules 300 specific to at least one other native language different than the particular native language. At operation 408, the method 400 also includes providing, by the data processing hardware 510, the transcription 120 for output.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
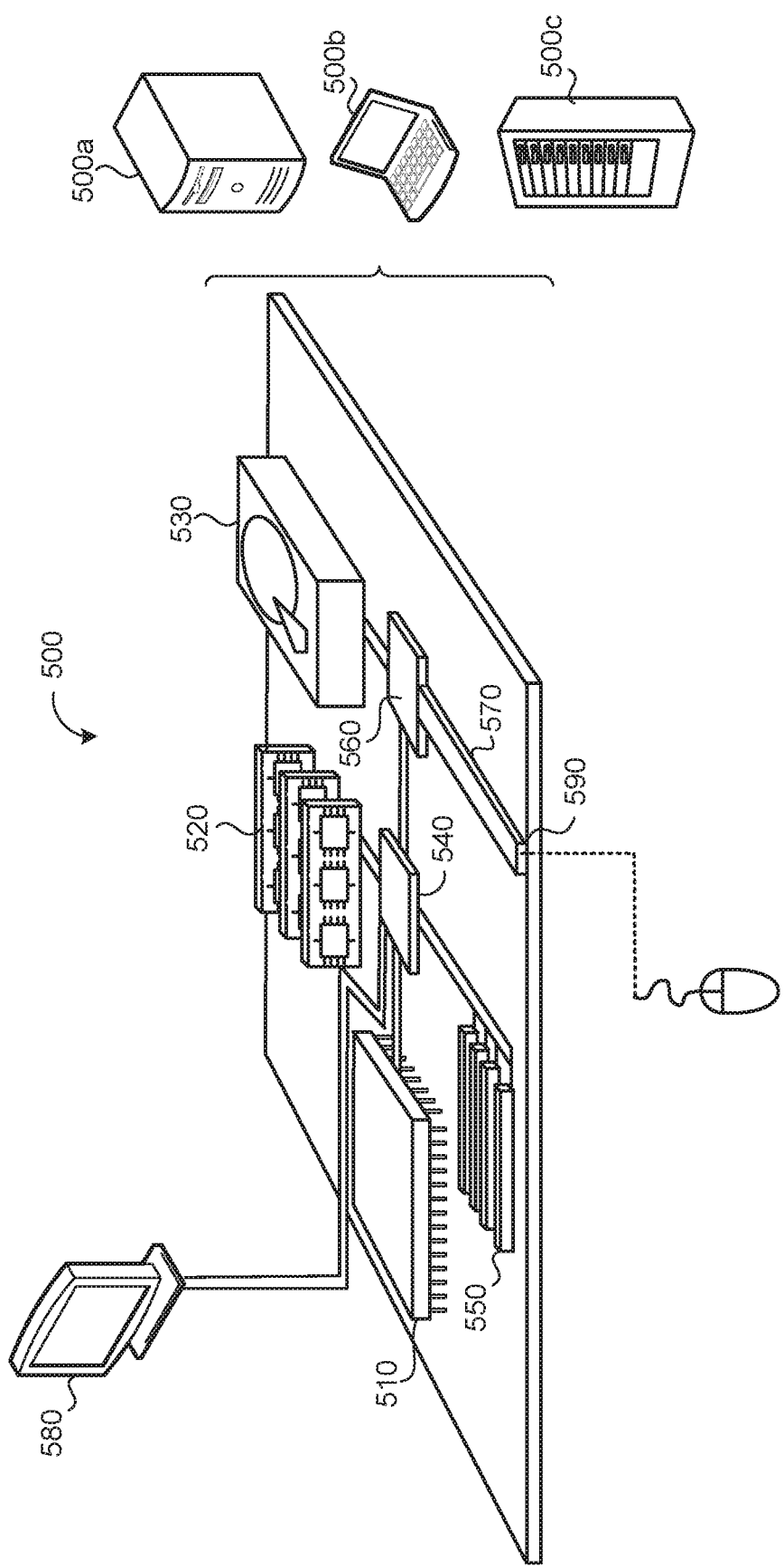
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, audio data for an utterance spoken in a particular native language;
obtaining, by the data processing hardware, a language vector identifying the particular native language;
processing, by the data processing hardware, using a multilingual end-to-end (E2E) speech recognition model that uses a recurrent neural network-transducer (RNN-T) architecture comprising an encoder network, the language vector and acoustic features derived from the audio data to generate a transcription for the utterance, the multilingual E2E speech recognition model comprising a plurality of language-specific adaptor modules that include one or more adaptor modules specific to the particular native language and one or more other adaptor modules specific to at least one other native language different than the particular native language, wherein processing the language vector causes the multilingual E2E speech recognition model to activate the one or more adaptor modules specific to the particular native language so that the multilingual E2E speech recognition model only applies the activated one or more adaptor modules specific to the particular native language without applying the one or more other adaptor modules specific to the at least one other native language when processing the acoustic features derived from the audio data to generate the transcription; and
providing, by the data processing hardware, the transcription for output,
wherein the encoder network of the RNN-T architecture comprises:
a plurality of stacked Long Short-Term Memory (LSTM) layers; and
after each LSTM layer, a respective layer comprising a respective subset of the plurality of language-specific adaptor modules, each language-specific adaptor module in the respective layer specific to a different respective native language, wherein one of the language-specific adaptor modules in the respective layer is specific to the particular native language.

2. The method of claim 1, wherein the language vector comprises a one-hot vector.

3. The method of claim 1, further comprising, prior to processing the language vector and the acoustic features, generating, by the data processing hardware, using the audio data, a vector representation of the utterance, the vector representation of the utterance comprising the acoustic features derived from the audio data.

4. The method of claim 3, further comprising:
concatenating, by the data processing hardware, the language vector and the vector representation of the utterance to generate an input vector,
wherein processing the language vector and the acoustic features comprises processing, using the multilingual E2E speech recognition model, the input vector to generate the transcription for the utterance.

5. The method of claim 1, wherein obtaining the language vector comprises:
identifying the particular native language for the utterance based on a language preference for a user that spoke the utterance; and
generating the language vector based on the identified particular native language.

6. The method of claim 1, wherein obtaining the language vector comprises:
executing a language identification system configured to identify the particular native language by processing the audio data; and
generating the language vector based on the identified particular native language.

7. The method of claim 1, wherein the RNN-T architecture comprises:
the encoder network configured to generate, at each of a plurality of time steps, a higher-order feature representation from an input vector, the input vector comprising a concatenation of the language vector and the acoustic features derived from the audio data;
a prediction network configured to process a sequence of previously output non-blank symbols into a dense representation; and
a joint network configured to predict, at each of the plurality of time steps, a probability distribution over possible output labels based on the higher-order feature representation output by the encoder network and the dense representation output by the prediction network.

8. The method of claim 1, wherein the generated transcription for the utterance is in a respective native script representing the particular native language.

9. The method of claim 1, wherein the data processing hardware and the multilingual speech recognition model reside on a user device associated with a user that spoke the utterance.

10. The method of claim 1, wherein the multilingual E2E speech recognition model is trained by a training process, the training process comprises:

obtaining a plurality of training data sets each associated with a respective native language that is different than the respective native languages of the other training data sets, each training data set comprising a plurality of respective training data samples, each training data sample comprising audio data for an utterance spoken in the respective native language, a language identifier identifying the respective native language, and a corresponding transcription of the utterance in a respective native script representing the respective native language;

during a first stage of the training process, training the multilingual E2E speech recognition model on a union of all of the training data sets using a stochastic optimization algorithm; and during a second stage of the training process after the first stage is complete:
modifying the multilingual E2E speech recognition model to include the plurality of language-specific adaptor modules; and
for each of the one or more adaptor modules that are specific to the particular native language, learning values for a respective set of weights by training the multilingual E2E speech recognition model only on the training data set that is associated with the respective particular native language.

11. The method of claim 10, wherein the training process executes on a remote computing device in communication with the data processing hardware, the data processing hardware residing on a user device associated with a user that spoke the utterance and configured to execute the multilingual E2E speech recognition model after the training process is complete.

12. A system comprising:
data processing hardware; and
memory hardware in communication with the data processing hardware, the memory hardware storing instructions that when executed on the data processing hardware cause the data processing hardware to perform operations comprising:
receiving audio data for an utterance spoken in a particular native language;
obtaining a language vector identifying the particular native language;
processing, using a multilingual end-to-end (E2E) speech recognition model that uses a recurrent neural network-transducer (RNN-T) architecture comprising an encoder network, the language vector and acoustic features derived from the audio data to generate a transcription for the utterance, the multilingual E2E speech recognition model comprising a plurality of language-specific adaptor modules that include one or more adaptor modules specific to the particular native language and one or more adaptor modules specific to at least one other native language different than the particular native language, wherein processing the language vector causes the multilingual E2E speech recognition model to activate the one or more adaptor modules specific to the particular native language so that the multilingual E2E speech recognition model only applies the activated one or more adaptor modules specific to the particular native language without applying the one or more other adaptor modules specific to the at least one other native language when processing the acoustic features derived from the audio data to generate the transcription; and
providing the transcription for output,
wherein the encoder network of the RNN-T architecture comprises:
a plurality of stacked Long Short-Term Memory (LSTM) layers; and
after each LSTM layer, a respective layer comprising a respective subset of the plurality of language-specific adaptor modules, each language-specific adaptor module in the respective layer specific to a different respective native language, wherein one of the language-specific adaptor modules in the respective layer is specific to the particular native language.

13. The system of claim 12, wherein the language vector comprises a one-hot vector.

14. The system of claim 12, wherein the operations further comprise, prior to processing the language vector and the acoustic features, generating, using the audio data, a vector representation of the utterance, the vector representation of the utterance comprising the acoustic features derived from the audio data.

15. The system of claim 12, wherein the operations further comprise:
concatenating the language vector and the vector representation of the utterance to generate an input vector,
wherein processing the language vector and the acoustic features comprises processing, using the multilingual E2E speech recognition model, the input vector to generate the transcription for the utterance.

16. The system of claim 12, wherein obtaining the language vector comprises:
identifying the particular native language for the utterance based on a language preference for a user that spoke the utterance; and
generating the language vector based on the identified particular native language.

17. The system of claim 12, wherein obtaining the language vector comprises:
executing a language identification system configured to identify the particular native language by processing the audio data; and
generating the language vector based on the identified particular native language.

18. The system of claim 12, wherein the RNN-T architecture comprises:
the encoder network configured to generate, at each of a plurality of time steps, a higher-order feature representation from an input vector, the input vector comprising a concatenation of the language vector and the acoustic features derived from the audio data;
a prediction network configured to process a sequence of previously output non-blank symbols into a dense representation; and
a joint network configured to predict, at each of the plurality of time steps, a probability distribution over possible output labels based on the higher-order feature representation output by the encoder network and the dense representation output by the prediction network.

19. The system of claim 12, wherein the generated transcription for the utterance is in a respective native script representing the particular native language.

20. The system of claim 12, wherein the data processing hardware and the multilingual speech recognition model reside on a user device associated with a user that spoke the utterance.

21. The system of claim 10, wherein the multilingual E2E speech recognition model is trained by a training process, the training process comprises:
- obtaining a plurality of training data sets each associated with a respective native language that is different than the respective native languages of the other training data sets, each training data set comprising a plurality of respective training data samples, each training data sample comprising audio data for an utterance spoken in the respective native language, a language identifier identifying the respective native language, and a corresponding transcription of the utterance in a respective native script representing the respective native language;
- during a first stage of the training process, training the multilingual E2E speech recognition model on a union of all of the training data sets using a stochastic optimization algorithm; and
- during a second stage of the training process after the first stage is complete:
  - modifying the multilingual E2E speech recognition model to include the plurality of language-specific adaptor modules; and
  - for each of the one or more adaptor modules that are specific to the particular native language, learning values for a respective set of weights by training the multilingual E2E speech recognition model only on the training data set that is associated with the respective particular native language.

22. The system of claim 21, wherein the training process executes on a remote computing device in communication with the data processing hardware, the data processing hardware residing on a user device associated with a user that spoke the utterance and configured to execute the multilingual E2E speech recognition model after the training process is complete.

* * * * *